No. 698,974. Patented Apr. 29, 1902.
L. LEHOTZKY & S. FURST.
NUT LOCK.
(Application filed Dec. 18, 1901.)
(No Model.)
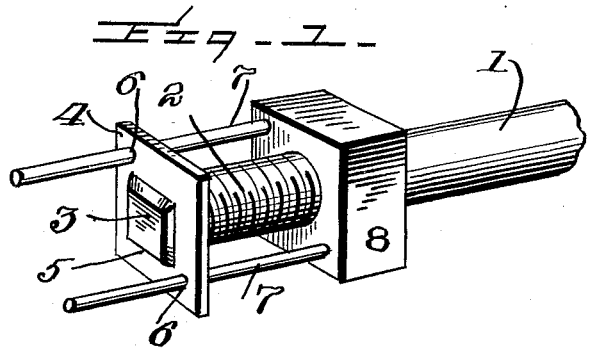
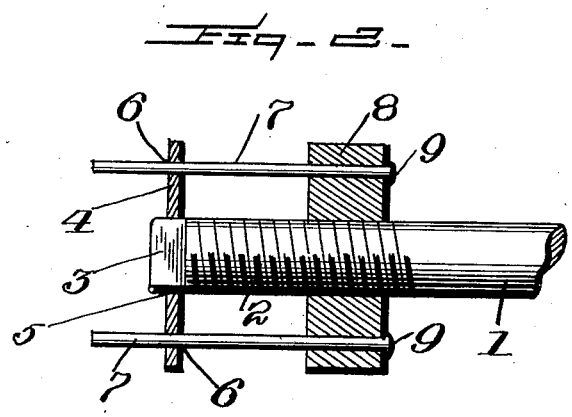
Witnesses:
Inventors,
Samuel Furst and
Lorentz Lehotzky.
Attorneys.

UNITED STATES PATENT OFFICE.

LORENTZ LEHOTZKY AND SAMUEL FURST, OF McKEESPORT, PENNSYLVANIA.

NUT-LOCK.

SPECIFICATION forming part of Letters Patent No. 698,974, dated April 29, 1902.

Application filed December 18, 1901. Serial No. 86,363. (No model.)

*To all whom it may concern:*

Be it known that we, LORENTZ LEHOTZKY and SAMUEL FURST, citizens of the United States of America, residing at McKeesport, in the county of Allegheny and State of Pennsylvania, have invented certain new and useful Improvements in Nut-Locks, of which the following is a specification, reference being had therein to the accompanying drawings.

This invention relates to certain new and useful improvements in nut-locks, and has for its object the provision of novel means whereby a nut will be prevented from turning upon a bolt.

The present invention further aims to construct a nut-lock that will be extremely simple in construction, strong, durable, and comparatively inexpensive to manufacture.

Another object of the invention is to provide a nut-lock that may be used a number of times and one that may be easily removed and replaced when the occasion requires.

With the above and other objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate like parts throughout the several views, in which—

Figure 1 is a perspective view of our improved nut-lock, showing the same in a locked position. Fig. 2 is a sectional view taken on the line 2 2 of Fig. 1.

The bolt 1 has the usual threaded portion 2, the extremity of which is formed into a substantially square portion 3, receiving a retaining-plate 4 in the square opening 5 therein. This retaining-plate may be of any desired shape, this being immaterial to the attainment of the object of our invention.

A number of fastening-rods 7 are rigidly secured to the nut 8 diagonally opposite each other and are preferably secured by passing their one end through apertures provided therefor in the nut and heading the end, as shown at 9. The retaining-plate has perforations 6 therein, which receive the free ends of the fastening-rods 7. The nut having been screwed to the desired position, the retaining-plate is then slipped over the rods and the nut turned until the square opening in the retaining-plate registers with the square end of the bolt, when the retaining-plate is moved to engage therewith.

It will be seen that when the parts are placed in position, as shown in Figs. 1 and 2 of the drawings, it will be impossible for the nut to turn and that the same will be retained in the locked position until the washer and rods are removed.

The many advantages obtained by the use of our improved device will be readily apparent from the foregoing description, taken in connection with the accompanying drawings.

It will be noted that various changes may be made in the details of construction without departing from the general spirit of our invention.

Having fully described our invention, what we claim as new, and desire to secure by Letters Patent, is—

1. The combination with a bolt having a square end, and a nut having oppositely-arranged rods passed therethrough and rigidly secured to said nut with the free ends of the rods extending beyond said square end of the bolt, and a locking device comprising in its entirety an entirely-removable plate apertured to receive said square end of the bolt and to have the said free ends of the rods pass therethrough, said plate being engaged on said rods and moved horizontally to engage said square end of the bolt, substantially as described.

2. The combination with a bolt having a square end, and a nut, of rods passing through openings in the nut and having their free ends extending beyond the square end of the bolt, and a locking device comprising in its entirety a removable plate having a square central aperture to receive said square end of the bolt, and a series of smaller apertures located between the said central aperture and the edges of the plate, said smaller apertures adapted to receive the free ends of the said rods, whereby the plate can be slid thereon and have its central aperture brought into engagement with the bolt's square end.

In testimony whereof we affix our signatures in the presence of two witnesses.

LORENTZ LEHOTZKY.
SAMUEL FURST.

Witnesses:
JOHN NOLAND,
E. E. POTTER.